(12) United States Patent
Hirsch

(10) Patent No.: US 8,595,105 B2
(45) Date of Patent: Nov. 26, 2013

(54) SYSTEM AND METHOD FOR USING AN ANALOGY IN THE MANAGEMENT OF PERSONAL FINANCES

(75) Inventor: David Hirsch, Tampa, FL (US)

(73) Assignee: Fantasy Finance Ventures, LLC, Tampa, FL (US)

( * ) Notice: Subject to any disclaimer, the term of this patent is extended or adjusted under 35 U.S.C. 154(b) by 22 days.

(21) Appl. No.: 13/176,966

(22) Filed: Jul. 6, 2011

(65) Prior Publication Data
US 2012/0246045 A1 Sep. 27, 2012

Related U.S. Application Data

(60) Provisional application No. 61/467,092, filed on Mar. 24, 2010.

(51) Int. Cl.
*G06Q 40/00* (2012.01)
(52) U.S. Cl.
USPC .................. 705/35; 700/91; 382/115; 463/29
(58) Field of Classification Search
USPC .............. 705/35; 382/115; 380/277; 463/29; 700/91
See application file for complete search history.

(56) References Cited

U.S. PATENT DOCUMENTS

| | | | |
|---|---|---|---|
| 6,430,542 B1 * | 8/2002 | Moran ......................... | 705/36 R |
| 8,297,621 B1 * | 10/2012 | Chao et al. ..................... | 273/297 |
| 2003/0093352 A1 | 5/2003 | Muralidhar et al. | |
| 2005/0021457 A1 * | 1/2005 | Johnson et al. ................. | 705/39 |
| 2007/0135191 A1 * | 6/2007 | Baker et al. ........................ | 463/1 |
| 2007/0233585 A1 | 10/2007 | Ben Simon et al. | |
| 2008/0235154 A1 | 9/2008 | Jones et al. | |
| 2008/0243716 A1 | 10/2008 | Ouimet et al. | |
| 2009/0024540 A1 * | 1/2009 | Ryder ......................... | 705/36 R |
| 2009/0164385 A1 | 6/2009 | Frain et al. | |
| 2009/0325132 A1 * | 12/2009 | Lees ............................. | 434/107 |
| 2010/0094740 A1 * | 4/2010 | Richter ........................... | 705/35 |
| 2010/0248192 A1 * | 9/2010 | Thompson et al. ........... | 434/107 |

FOREIGN PATENT DOCUMENTS

RU 2213369 C2 9/2003

OTHER PUBLICATIONS

Jim Wang, What Football Teaches Us About Personal Finance,http://www.bargaineering.com/articles/what-football-teaches-us-about-personal-finance.html, Dec. 18, 2007, (Football Personal Finance).*
Fernado Ramos et al, Soccer Strategies that Live in the B2B world of negotiation and decision making, Elsevier, Feb. 2002, p. 287-310 (Soccer).*
Financial Football Game, website first online May 10, 2009.
Jim Wang, What Football Teaches Us About Personal Finance,http://www.bargaineering.com/articles/what-football-teaches-us about personal-finance.html, Dec. 18, 2007, (Football Personal Finance).

* cited by examiner

*Primary Examiner* — Chika Ojiaku
(74) *Attorney, Agent, or Firm* — Larson & Larson, P.A.; Frank Liebenow; Justin Miller

(57) ABSTRACT

A system for presenting a user's financial status captures a user's financial, demographic and goal information and calculates the user's financial status based upon their goals. The system then translates the user's financial status into an analogy that the user is apt to understand better than financial terms. The user is presented with their financial status in terms of the analogy such as a score. One such analogy is a football game, in which the user's financial status is translated and portrayed/displayed in terms of a football game, winning (attaining his or her goals) or losing (not doing well at attaining the goals), etc.

22 Claims, 24 Drawing Sheets

PROFILE

AGE: _____
DESIRED RETIREMENT AGE: _____  } 102
AGE OF ENTRY TO WORKFORCE: _____  } 104

INCOME:
NET EARNED INCOME: $_____
NET INVENSTMENT INCOME: $_____
OTHER INCOME: $_____

EXPENSES:
HOUSING EXPENSES: $_____
UTILITIES EXPENSES: $_____
DEBT SERVICE: $_____  } 106
OBLIGATIONS: $_____
DISCRETIONARY SPENDING: $_____
OTHER EXPENSES: $_____

ASSETS:
TOTAL LIQUID ASSETS: $_____  } 108
NET INVENSTMENT INCOME: _____ %

[SUBMIT] — 109

Figure 7:
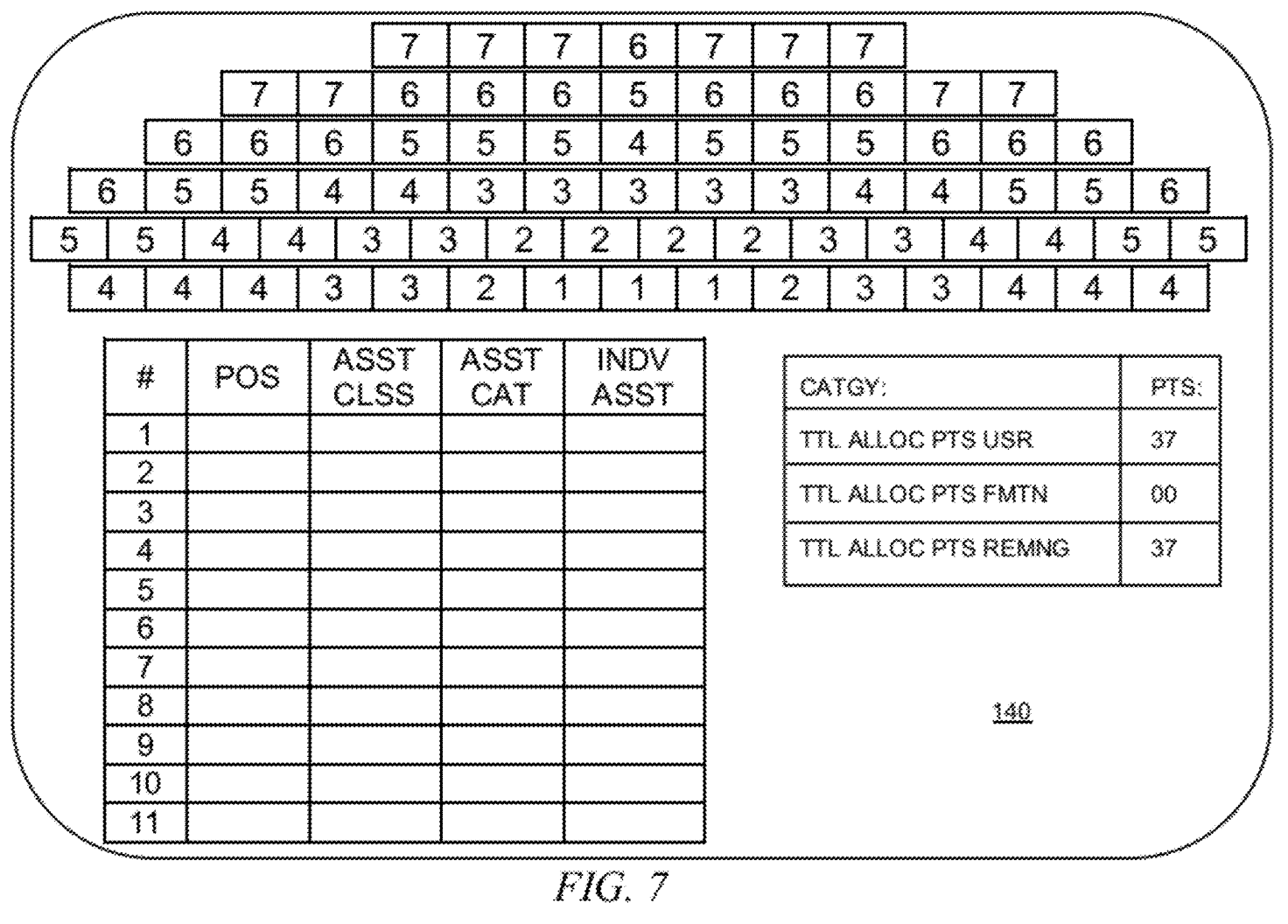

| CATGY: | PTS: |
|---|---|
| TTL ALLOC PTS USR | 37 |
| TTL ALLOC PTS FMTN | 00 |
| TTL ALLOC PTS REMNG | 37 |

140

| # | POS | ASST CLSS | ASST CAT | INDV ASST |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |

| # | POS | ASST CLSS | ASST CAT | INDV ASST |
|---|-----|-----------|----------|-----------|
| 1 | FS | 6 | | |
| 2 | SS | 5 | | |
| 3 | CB | 4 | | |
| 4 | CB | 4 | | |
| 5 | CB | 4 | | |
| 6 | LB | 3 | | |
| 7 | LB | 3 | | |
| 8 | DE | 2 | | |
| 9 | DE | 2 | | |
| 10 | DT | 1 | | |
| 11 | DT | 1 | | |

| CATGY: | PTS: |
|--------|------|
| TTL ALLOC PTS USR | 37 |
| TTL ALLOC PTS FMTN | 35 |
| TTL ALLOC PTS REMNG | 02 |

160

| FINANCIAL DATA | EXPLANATION |
|---|---|
| Age of Workforce Entry (AWE) | Approximate age the user entered the workforce. |
| Current Age (CA) | The current age of the user |
| Age of Desired Retirement (ADR) | The age that the user wants to retirement |
| Net Earned Income (NEI) | User earnings per year net of taxes, FICA, etc. |
| Net Investment Income (NII) | User earnings per year on returns from liquid Assets net of taxes |
| Net Investment Return (NIR) | The net percentage return on the user's liquid Assets net of taxes |
| Other Net Income (ONI) | Any and all income the user receives from other sources net of taxes |
| Housing Expenses (HE) | User expenses per year on housing, including PITI, rent, maintenance, etc. |
| Utilities (UTS) | The amount the user spend on all Utilities (gas, electric, telecom, cable, etc) |
| Debt Service (DS) | User expense on servicing non-housing related debt (includes P&I) |
| Obligations (OBS) | User payments in monthly obligations such as alimony or child support |
| Discretionary Spending (DISCS) | Discretionary spending, incl. meals, vacations, clothing, entertainment, etc. |
| Healthcare (HC) | The amount the user spends on Healthcare each year – i.e. the total premiums and average out of pocket expenses borne by the user |
| Other Expenses (OE) | All other expenses |
| Short-Term Assets (STA) | The User's total liquid assets (e.g. cash and readily marketable instruments) |
| Market-Value Long-Term Assets (MVLTA) | The Market Value of the User's Long-Term Assets of those assets that are not readily marketable such as real estate, automobile, collectibles, etc. |
| Short-Term Liabilities (STL) | The User's total liabilities that are due within one year. |
| Long-Term Liabilities (LTL) | The User's total liabilities that mature in more than one year such as Mortgages, car loans, student loans, etc. |
| Estimated Underemployment (ELU) | Estimated length of underemployment in month. |
| Annual Net Income (ANIFE) | Annual net income if fully employed |
| Stability | Stability of AAFCF (1-5) |
| Duration | Estimated duration of AAFCF (1-5) |
| Net AAFCF Growth Rate | Estimated cash flow growth rate in percentage |

*FIG. 11*

| CALCULATED VALUE | FORMULA |
|---|---|
| Years to Retirement (YTR) | = ADR - CA |
| Life Expectancy (LE) | = See Life Expectancy Table IRS 1 + CA |
| Additional Years Life Expectancy (AYLE) | = See Life Expectancy Table IRS 1 |
| Retirement Years Anticipated (RYA) | = AYLE - ADR |
| Total In-Come (TICO) | = NEI + NII + ONI |
| Total Out-Go (TOGO) | = HE + UTS + DS + OBS + DISCS + HC + OE |
| Out-Go Adjustment Multiple (OGAM) | = 1.05 (Unless Changed by User) |
| Adjusted Out-Go (ADOGO) | = TOGO x OGAM |
| Adjusted Annual Free Cash Flow (AAFCF) | = TICO - ADOGO |
| AAFCF if Fully-Employed (AAFCFFE) | = ANIFE - ADOGO |
| Net AAFCF Growth Rate (NAAFCFGR) | = 0.00% (Unless Changed by User Input) |
| Years of Accrued Current AAFCF Underemployed (YACRUE) | = ELU / 12 |
| Accrued Current AAFCF Underemployed (ACRFAAFCF) | = YACRUE x ELU |
| Years of Accrued Future AAFCF Fully-Employed (YACRFE) | = YTR - YACRUE |
| Accrued Future AAFCF Fully-Employed (ACRFAAFCFFE) | = YACRFE x AAFCFFE |
| Special Asset | = Max(0, -PV(-NAAFCFGR, YACRFE, AAFCFFE) + YACRUE x ACAAFCFUE) |
| Total Assets | = STA + Special Asset + MVLTA |
| Special Liability | = -Min(0, -PV(-NAAFCFGR, YACRFE, AAFCFFE) + YACRUE x ACAAFCFUE) |
| Total Liabilities | = STL + Special Liability + LTL |
| Equity | = Total Assets -- Total Liabilities |
| Working Capital | = STA - STL |
| Adjusted Working Capital | = STA + Special Asset -- (STL + Special Liability) |
| Non-Liquidation Survival Time (NLST) | = Working Capital / ADOGO |
| Liquidation Survival Time (LST) | = (Working Capital + MVLTA -- LTL) / ADOGO |

FIG. 12

| CALCULATED VALUE | | FORMULA |
|---|---|---|
| | Special Liability | = MIN(0, -PV(-NAAFCFGR,YACRFE, MFCFFE) + -PV(-NAAFCFGR, YACRUE, AAFCF)) |
| | Special Asset | = MAX(0, -PV(-NAAFCFGR, YACRFE, AAFCFFE) + -PV(-NAAFCFGR, YACRUE, AAFCF)) |
| | Underemployed ( UE ) | = If( NEI < ANIFE, Yes , No ) |
| | Underemployed & BK before Fully-Employed ( UEBK ) | = If(and(UE = Yes, STA + ACRF/AAFCF < 0), 1, 0) |
| | Fully-Employed, Headed for BK ( FEBK ) | = If(and (UE = No, AWC < 0, 1, 0) |
| | Technically Insolvent ( TI ) | = If(Or(STL > STA + AAFCF, STA + AAFCF < 0), 1, 0) |
| | No Win Scenario | = If( UEBK + FEBK + TI > 0, 1, 0) |
| | No Lose Scenario | = If(Or( NLST > AYLE, NI > ADOGO, 1, 0) |

FIG. 13

| FUNCTION | FORMULA WHEN ON OFFENSE | FORMULA WHEN ON DEFENSE |
|---|---|---|
| Quarter | = Roundup((CA – AWE) / ((ADR-AWE)/4),0) | Same |
| Minutes | = Rounddown(-(((CA–AWE) / ((ADR-AWE)/4) – Quarter) x 15),0) | Same |
| Seconds | = (-(((CA-AWE) / ((ADR-AWE)/4) – Quarter) x 15) – Minutes) x (60/100) | Same |
| Possession | = If(AAFCF > 0, "Offense", "Defense") | Same |
| Home Score | = Max(0, Rounddown(AWC/ADOGO,0)) | Same |
| Away Score | = If(Equity < 0, RYE – Roundup(Equity/ADOGO),0), RYE) | Same |
| Yardage | =Min(99, Int(NLST x 10)) | Same |
| Down | If(or(Stability < 2, Duration < 2, Stability + Duration <=4), 4, Max (1, Roundup(((10 – (Stability + Duration)) / 2),0))) | = 5 – Min(4, Roundup((ELU/6),0)) |
| Yards-To-Go ("YTG") | = If(Down = 1, Min(10, 100-Yardage), Min((6-Stability) x (6-Duration)), 100 – Yardage)) | = If(or(Down = 1, Special Asset > 0), Min (10, Yardage), Min(20, Roundup(LA / Special Liability,0), Yardage) |
| Ball On | = If(Yardage > 51,100- Yardage, Yardage) | Same |
| Side of Field | = If (Yardage > 50, "AWAY", "HOME) | Same |

*FIG. 14*

Basic Information:
Name: John Q. Public
Current age: 37
Age of workforce entry: 22
Age of desired retirement: 62
Years until desired retirement: 25
Life expectancy: IRS 1 table: 47
Life expectancy: 84
Retirement years expected: 22

Cash Flow:
Net earned income: $55,000
Net investment income: -
Other net income: -
Total Income: $55,000
Housing: $15,000
Utilities: $ 5,000
Debt service: $ 3,600
Obligations: -
Healthcare: $ 2,000
Discretionary: $10,000
Other: -
Total out-Go: $35,600
Adjustment multiple: 1.05
Adjusted out-Go: $37,380
AAFCF: $17,620

Personal Balance Sheet:
Assets:
Liquid Assets: $100,000
Special Asset (PV of future AAFCF): $440,500
Market Value of Long-term Assets: $150,000
Total Assets: $690,500

Liabilities:
Short-term Debt: -
Special Liability: -
Long-term Debt: $150,000
Total Liabilities: $150,000

Total Equity: $540,500

Total Liabilities + Equity: $690,500

Other:
AAFCF Stability (1-5): 2
AAFCF Duration (1-5): 4
Risk Profile: Moderately Aggressive
Non-liquidation Survival Time: 2.68 years

*FIG. 15*

| FINANCIAL DATA | FROM DATA |
|---|---|
| Age of Workforce Entry (AWE) | 22 |
| Current Age (CA) | 37 |
| Age of Desired Retirement (ADR) | 62 |
| Net Earned Income (NEI) | 55,000 |
| Net Investment Income (NII) | 0 |
| Net Investment Return (NIR) | 0 |
| Other Net Income (ONI) | 0 |
| Housing Expenses (HE) | 15,000 |
| Utilities (UTS) | 5,000 |
| Debt Service (DS) | 3,600 |
| Obligations (OBS) | 0 |
| Discretionary Spending (DISCS) | 10,000 |
| Healthcare (HC) | 2,000 |
| Other Expenses (OE) | 0 |
| Liquid Assets (STA) | 100,000 |
| Market Value LTA (MVLTA) | 150000 |
| Short-term Liabilities (STL) | 0 |
| Long-term Liabilities (LTL) | 150000 |
| Annual Net If Fully-Employed (ANIFC) | 55000 |
| Estimated Months Until Full-Employment (ELU) | NA |
| Real Net AAFCF Growth Rate (RNAAFCFGR) | 0% |

| VARIABLE | VALUE |
|---|---|
| YTR | 25 |
| LE | 84 |
| AYLE | 47 |
| RYA | 22 |
| TICO | 55,000 |
| TOGO | 35,600 |
| OGAM | 1.05 |
| ADOGO | 37,380 |
| AAFCF | 17620 |
| AAFCFFE | 17620 |
| NAAFCFGR | 0.00% |
| YACRUE | 0.00 |
| ACRCAAFCF | 0.00 |
| YACRFE | 25 |
| ACRFAAFCFFE | 440,500 |
| Special Asset | 440,500 |
| Total Assets | 690,500 |
| Special Liability | 0.00 |
| Total Liabilities | 150.00 |
| Equity | 540,500 |
| Working Capital | 100,000 |
| Adj Working Capital | 540,500 |
| Non-Liquid Survival T | 2.68 |
| Liquidation Survival T | 2.68 |

| VARIABLE | VALUE |
|---|---|
| UE | No |
| UEBK | 0 |
| FEBK | 0 |
| TI | 0 |
| No Win | 0 |
| No Lose Scenario | 0 |

*FIG. 16*

| SCORE | USER IS ON OFFENSE |
|---|---|
| Quarter | 2 |
| Minutes | 7 |
| Seconds | 30 |
| Possession | Home |
| Home Score | 14 |
| Away Score | 22 |
| Yardage | 26 |
| Down | 2 |
| Yards-To-Go ("YTG") | 8 |
| Ball On | 26 |
| Side of Field | Home |

*FIG. 17*

| BASEBALL | | |
|---|---|---|
| FUNCTION | FORMULA WHEN ON OFFENSE | FORMULA WHEN ON DEFENSE |
| Inning | = Int(((CA – AWE) / (ADR-AWE))*9)) | Same |
| Team at-bat | = IF(AAFCF > 0, "Bottom of Inning", "Top of Inning") Note: User is always "Home Team" | Same |
| Home Score | = MAX(0, ROUNDDOWN(AWC/ADOGO,0))/5 | Same |
| Away Score | = If(Equity < 0, RYE – Roundup((Equity/ADOGO),0), RYE)/5 | Same |
| Outs | =IF(OR(Stability < 2, Duration < 2, (Stability+Duration) <=4), 2, (Stability+Duration)/2,0)) MIN(2.5-ROUNDUP((Stability+Duration) | = -(Min(3, Roundup((ELU/6),0),-3) |

FIG. 19

| SOCCER | | |
|---|---|---|
| FUNCTION | FORMULA WHEN ON OFFENSE | FORMULA WHEN ON DEFENSE |
| Period | = ROUNDUP((CA – AWE) / ((ADR-AWE)/2),0) | Same |
| Minutes | = ROUNDDOWN(-(((CA-AWE) / ((ADR-AWE)/2) – Period) x 45),0) | Same |
| Seconds | = (-(((CA-AWE) / ((ADR-AWE)/4) – Period) x 45) - Minutes) x (60/100) | Same |
| Possession | = IF(AAFCF > 0, "Offense", "Defense") | Same |
| Home Score | = MAX(0, ROUNDDOWN(AWC/ADOGO,0) )/5 | Same |
| Away Score | = If(Equity < 0, RYE – Roundup(Equity/ADOGO),0), RYE)/5 | Same |

*FIG. 20*

| HOCKEY | | |
|---|---|---|
| FUNCTION | FORMULA WHEN ON OFFENSE | FORMULA WHEN ON DEFENSE |
| Period | = ROUNDUP(((CA – AWE) / ((ADR-AWE)/3),0) | Same |
| Minutes | = ROUNDDOWN(-(((CA-AWE) / ((ADR-AWE)/3) – Period) x 20),0) | Same |
| Seconds | = (-(((CA-AWE) / ((ADR-AWE)/3) – Period) x 20) - Minutes) x (60/100) | Same |
| Possession | = IF(AAFCF > 0, "Offense", "Defense") | Same |
| Home Score | = MAX(0, ROUNDDOWN(AWC/ADOGO,0),0)/5 | Same |
| Away Score | = If(Equity < 0, RYE – Roundup(Equity/ADOGO),0), RYE) /5 | Same |

| FUNCTION | BASKETBALL FORMULA WHEN ON OFFENSE | FORMULA WHEN ON DEFENSE |
|---|---|---|
| Quarter | = ROUNDUP((CA – AWE) / ((ADR-AWE)/3),0) | Same |
| Minutes | = ROUNDDOWN(-(((CA-AWE) / ((ADR-AWE)/4) – Quarter) x 20),0) | Same |
| Seconds | = (-((((CA-AWE) / ((ADR-AWE)/3) – Quarter) x 45) - Minutes) x (60/100) | Same |
| Possession | = IF(AAFOF > 0, "Offense", "Defense") | Same |
| Home Score | = MAX(0, ROUNDDOWN(AWC/ADOGO,0)) *4 | Same |
| Away Score | = If(Equity < 0, RYE – Roundup(Equity/ADOGO,0), RYE) *4 | Same |

| # | Allocation | Position | Asset Class | Asset Category | Individual Asset |
|---|---|---|---|---|---|
| 1 | 9.09% | WR | 7 | Domestic Small Cap Growth | Vanguard US Small Cap Growth Fund |
| 2 | 9.09% | WR | 7 | Global Small/Mid Cap Growth | Templeton Global Mid Cap Equities Fund |
| 3 | 9.09% | WR | 6 | Domestic Small Cap Core | Dreyfus US Small Cap Growth Fund |
| 4 | 9.09% | WR | 6 | International Multi-Cap Core | Templeton International Equities Core Fund |
| 5 | 9.09% | HB | 5 | Domestic Large Cap Growth | Fidelity Magellan Fund |
| 6 | 9.09% | QB | 3 | Domestic Large Cap Value | Federated US Large Cap Equities Fund |
| 7 | 9.09% | T | 2 | AA- Individual Bond | GE 10% Coupon Bond w/ Maturity 11/2013 |
| 8 | 9.09% | T | 2 | Short Investment Grade Debt | Barclays Short-term AAA Income Fund |
| 9 | 9.09% | G | 2 | Short Municipal Debt | Lonestar Municipal Bond Income Fund |
| 10 | 9.09% | G | 2 | General US Government | Principal General US Government Bond Fund |
| 11 | 9.09% | C | 1 | US Government Money Market | Fidelity US Government Money Market Fund |

*FIG. 23*

SYSTEM AND METHOD FOR USING AN ANALOGY IN THE MANAGEMENT OF PERSONAL FINANCES

CROSS-REFERENCE TO RELATED APPLICATION

This application is a non-provisional application taking priority from U.S. provisional patent application Ser. No. 61/467,092, filed Mar. 24, 2011, the disclosure of which is hereby incorporated by reference. This application is related to co-pending non-provisional application titled, "SYSTEM AND METHOD FOR USING AN ANALOGY IN THE MANAGEMENT OF ASSETS" filed even date here within.

FIELD

This invention relates to the field of finance and more particularly to a system and method that uses an analogous field for personal finance and portfolio management.

BACKGROUND

The world of finance is often a world filled with complex mathematical constructs and confusing acronyms. There are many people who know and understand how to calculate compound interest, the difference between net income, gross income, adjusted gross income, marginal tax rates, the future value of assets, IRA, 401K, money markets, certificates of deposit, bonds, positions, rate of return, average annual return, dividends, loading, short sells, etc. Many of these people are employed in the financial services industry as brokers, advisors, etc.

There are many more people who do not have a good understanding of the concepts of finance. These people often have good jobs, a good life and are working to be able to, some day, comfortably retire. Often, these people have specialties, but those specialties are not similar to the financial industry. Engineers, teachers, truck drivers, sales clerks, marketing people, etc., often have income, assets and investments but, generally have only a limited knowledge of the concepts of finance and the theories, mathematics and acronyms of the financial industry. To many of these people, the rules, concepts and jargon of finance are like a foreign language—they may have a rudimentary understanding of the language, but they don't have sufficient knowledge or experience to effectively apply the concepts and are forced to learn through trial and error, which is not a good idea when their assets and future are at stake.

On the other hand, many people who have income, assets and investments often have a passion, interest or general knowledge about another common system. For example, many such individuals enjoy sports such as football, baseball, soccer, basketball, etc. Engineers, teachers, truck drivers, sales clerks, marketing people, etc., often enjoy watching sports programs and following their favorite teams. Some have a general knowledge of the rules and jargon of one or more sports, while others have more detailed knowledge, even down to a quarterback's "QB rating," a pitcher's "earned run average," or a baseball player's "batting average." These people understand terms such as OBP, $4^{th}$ and goal, off sides, false start, screen pass, header, corner kick, double play, ERA, etc.

Many play these sports as part of a recreational league. For some, instead of playing the sport, they participate in "fantasy" leagues. For example, fantasy football allows individuals to create fictional teams of football players drawn from the players in the National Football League (NFL). The fictional teams then compete within the context of the fantasy football league. Individuals that are familiar with the fantasy football system are comfortable participating in drafts, making trades, and organizing a team in the fashion they believe will best allow them to compete against other teams. They are likely to be very comfortable in football parlance, and can give and receive information in that format. However, often these individuals are not necessarily versant in the world of finance. For these individuals, the relationship of time, money, and risk may not be as clear to them as a lateral pass or organizing a defensive line. They understand the difference between a spread formation and a shot-gun formation more than they understand the difference between common financial instruments (e.g., stocks, bonds, loans, interest rate swaps, futures, etc.).

What is needed is a financial method that analogizes financial information into similar constructs and places them in a scenario the user is more likely to understand because it relates to a system known by the user (i.e., football).

Once the analogy has been established between the known system and the concepts of finance, the user is afforded the ability to better understand the concepts of finance because the user has been previously related to the analogous system. This enhanced understanding of the concepts of finance through the analogous system enables the user to make better decisions in managing their personal finances and their securities portfolio.

SUMMARY

The described system captures a user's financial, demographic and goal information and calculates the user's financial status based upon their goals. The system then translates the user's financial status into an analogy that the user is apt to understand better than financial terms. One such analogy is a football game, in which the user's financial status is translated and portrayed/displayed in terms of a football game, winning (attaining his or her goals) or losing (not doing well at attaining the goals), etc.

In one embodiment, an apparatus for system for presenting financial data is disclosed including a computer with a storage operatively interfaced to the computer. A user profile containing user information and user financial data is stored on the storage. Software running on the computer reads the user profile and translates the user information and the user financial data into a financial status. The software displays the financial status in a presentation format according to a predetermined analogy. The presentation format is in terms of the analogy so that a person who understands the analogy (e.g. an analogy to a sport such as football) is apt to understand the data in terms of the analogy.

In another embodiment, an apparatus for system for presenting financial data is disclosed including a computer with a storage operatively interfaced to the computer. A user profile containing user information and user financial data is stored on the storage. Software running on the computer executes a first set of equations. The first set of equations calculates a financial status based upon the user information and user financial data. The software executes a second set of equations. The second set of equations translates the financial status into a presentation view according to a predetermined analogy. The presentation view is in terms of the predetermined sports analogy.

In another embodiment, an apparatus for system for presenting financial data is disclosed including a computer having a storage operatively interfaced to the computer. A user profile containing user information and user financial data is stored on the storage. Software running on the computer executes a first set of equations that calculates a financial status based upon the user information and user financial data. The software also executes a second set of equations that translates the financial status into a presentation view according to a predetermined analogy to a football game. The presentation view is in terms of the football game for easy understandability by one with knowledge of football parlances.

BRIEF DESCRIPTION OF THE DRAWINGS

The invention can be best understood by those having ordinary skill in the art by reference to the following detailed description when considered in conjunction with the accompanying drawings in which:

FIG. 4 illustrates a typical data entry form.

FIG. 7 illustrates a typical completed formation chart.

FIG. 8 illustrates a typical offensive formation chart.

FIG. 11 illustrates a first sample set of calculations.

FIG. 12 illustrates a second sample set of calculations.

FIG. 13 illustrates a third sample set of calculations.

FIG. 14 illustrates a sample calculations used to calculate the score board values for a football analogy.

FIG. 15 illustrates an exemplary set of data related to a fictitious person, John Q. Public.

FIG. 16 illustrates calculated values based upon the exemplary set of data.

FIG. 17 illustrates calculated score values based upon the exemplary set of data.

FIG. 19 illustrates a sample calculations used to calculate the score board values for a baseball analogy.

FIG. 20 illustrates a sample calculations used to calculate the score board values for a soccer analogy.

FIG. 21 illustrates a sample calculations used to calculate the score board values for a hockey analogy.

FIG. 22 illustrates a sample calculations used to calculate the score board values for a basketball analogy.

FIG. 23 illustrates a sample asset allocation for the football analogy.

DETAILED DESCRIPTION

Figure 1:
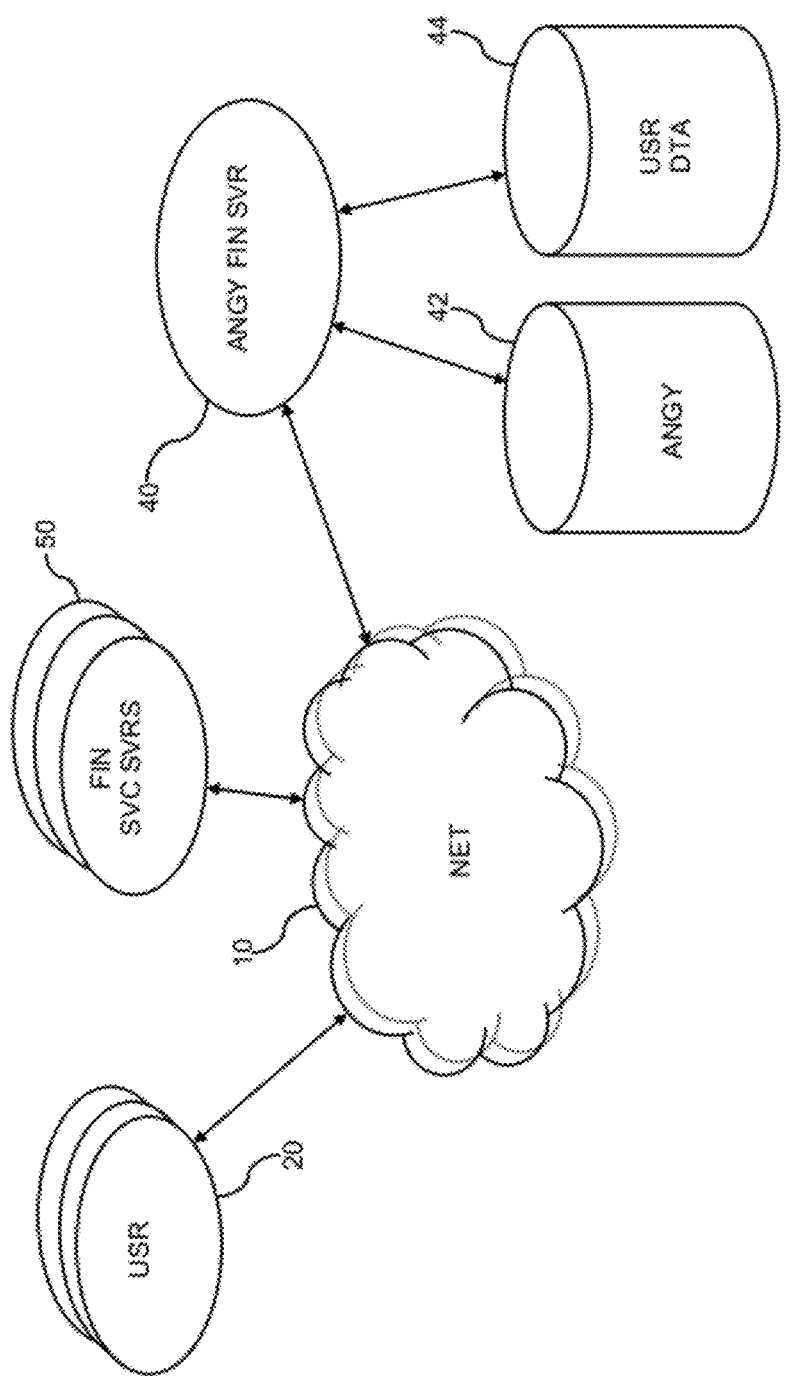
FIG. 1 illustrates a schematic view of a computer-based financial system.

Reference will now be made in detail to the presently preferred embodiments of the invention, examples of which are illustrated in the accompanying drawings. Throughout the following detailed description, the same reference numerals refer to the same elements in all figures.

While the disclosure below centers on an analogy between the game of football and the field of finance, there is no requirement that the analogy be made to football. Many games or systems with a defined set of rules and preferably having a score and adjustable components (e.g. players, cards, and variables) are readily analogized to the financial system, and therefore adapt the analogy system for different users with different knowledge bases about other things. For example, in some embodiments analogies to sports other than football, such as baseball or soccer, are used. In some embodiments, analogies to card games such as bridge or poker are used. In some embodiments, instead of analogies to sports and games, analogies are made to real-world situations, such as war, parenthood, etc.

In general, the status, or score, of the game (see scoreboard 120 in FIG. 5) relates the user's current, personal financial situation in terms of the analogous system (e.g. a football game). For example, the score in the game informs the user how well they are doing with respect to a variety of financial goals, such as the user's projected ability to retire by a certain age. Likewise, the allocation of the user's assets maps to a set of variable components or elements of the analogous system (e.g. in the football analogy, an asset of the user is mapped to a player in a formation for the football team). For example, if the user is in a good, perhaps winning financial position, the user selects an allocation of their assets (e.g. player selection/formation) in a more aggressive manner (e.g. a shotgun formation v. an "I" formation). In the analogous system, each variable component (e.g. player and player position) corresponds to a different asset class, asset category and specific asset, each with a varying degree of risk and projected return depending on their location on the field. As will be discussed, the user (or financial planner) selects or tunes various player formation maps to adjust the level of risk and projected return associated with their portfolio.

In general, a formation map is an assignment of one or more elements of the analogy to positions of the analogy. In other words, a formation map is an assignment of one or more element/players to one or more positions. In a sports analogy, a formation map is an assignment of one or more players to positions on the field.

For some users, the financial status is used to show how well the user is doing with respect to their goals. For other users, the formation of the team is used to visually depict the user's assets in a way that is understandable by the user of the analogy. For some users, both the score and formation are used together.

As will be shown, the rules associated with the formation are used to guide the user or financial planner to allocate assets in line with that user's financial status and risk profile. The rules described later with respect to the football analogy, when followed, require that the user's assets be allocated across a number of asset classes corresponding to specific player positions and locations within a player formation, each having different degrees of risk. In the football analogy example, asset classes with minimum risk such as T-bills related to the center while asset classes with high risks such as stock options.

Referring to FIG. 1, a schematic view of a computer-based financial system is shown. The interplay between the various systems will be described later. Shown in this exemplary system is an analogy financial server 40 having access to storage 42/44, the storage containing, among other things, analogy data 42 and user data 44. As described in FIG. 2, the analogy data 42 is, in some embodiments, tables or other representations of one or more analogies, though a fixed, hard-coded analogy is fully anticipated and included here within as well. By driving the analogy with a data set (analogy data 42), it is anticipated that a user will have one or more analogies from which to choose. For example, the user is provided with several sports scenarios as analogies and selects "football" but a few years later, the user being more interested in soccer, changes the preferred analogy to "soccer."

The account data 44 is data pertinent to the individual user and the computer-based financial system will have many users, each having account data 44. The account data 44 is preferably protected from unauthorized access by any method known in the industry such as username/password, biological passwords, etc. In some embodiments, the account data 44 includes goals (e.g. desired age of retirement), financial data (assets, income, outgo, etc.), and personal data (e.g. age, marital status, etc.). In some embodiments, the account data 44 also includes links to other financial services (e.g. financial servers 50) such as on-line bank, retirement and brokerage account access.

Also shown are one or more financial service servers 50 of various financial service providers such as banks, brokers, etc. The various computer systems 40/50 of this exemplary system are interconnected as known in the industry, for example through a network 10 such as the Internet 10.

Although any topology of computer systems 20/40/50 is anticipated, in this example, a set of client devices 20 are shown connected to the financial service server 50 through the network (e.g., Internet) 10. Some client devices 20 such as tablet PCs connect to the analogy server 40 through the network 10 (Internet) while other client devices 20 such as cell phones 20 connect through the cellular network (e.g. cell towers, cellular infrastructure, etc., not shown for brevity reasons) and through the network (e.g. Internet) 10 to the analogy server 40.

Although not required, it is anticipated that some or all transactions between the various computer systems 20/40/50 are properly encoded and encrypted so as to prevent theft of information, hacking, replay, reuse, etc. Various encoding and encryption mechanisms are known in the industry such as transport layer security (TLS) and/or session layer encryption such as Secure Sockets Layer (SSL) encryption. Mechanisms such as these are used, for example, to protect financial information, account information, etc., transmitted over the Internet 10.

Figure 2:
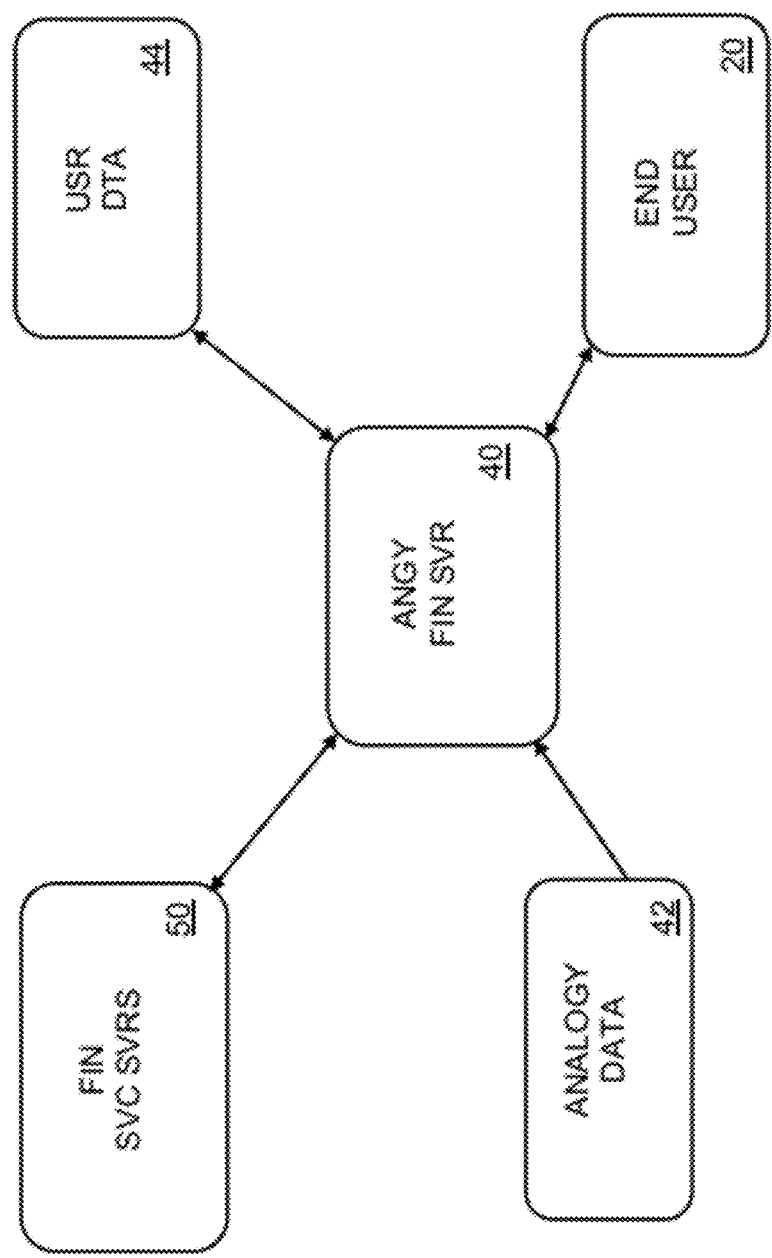
FIG. 2 illustrates a data relationship chart of the computer-based financial system, showing the exchange of data.

Referring to FIG. 2, a data relationship chart of the computer-based financial system, showing the exchange of data is shown. Although this example shows that the analogy is table driven, having a data source or table containing analogy data 42, any implementation known in computer science is anticipated including fixed software routines that implement the analogy, etc. In the examples shown, the analogy data 42 creates an analogy between the terminology, actions, reactions, flows, status, moves, operations, pitfalls, etc., of the financial systems and the target of the analogy, for example, the game of football. As stated above, any analogy is anticipated such as an analogy between finance and soccer, between finance and pinochle, between finance and baseball, etc. It is anticipated that the analogy data for other analogies includes score-board representations (see FIG. 5) suitable for such analogies.

The analogy finance system 40 uses the analogy data 42 (or fixed program instructions) to control the operation and provide the desired analogy (e.g. between finance and football). The analogy finance system 40 accepts user financial data 44 from a user of the system, an example of which is shown in FIG. 4. The user data 44 includes incomes, outflows, assets, investments, demographic information, goals, etc. In general, the user interfaces to the analogy finance system 40 to/from a user computer 20 such as a personal computer 20, tablet computer 20, cellular "smart" phone 20, etc.

In some embodiments, the analogy finance system 40 interfaces to one or more external financial service servers 50. In some embodiments, the user data 44 also includes account information such as bank accounts, retirement accounts, broker accounts, etc., and the analogy finance system 40 accesses these accounts from the financial servers 50 through the network 10. In some embodiments, the analogy finance system 40 accesses these accounts to update the user data 44 with regards to current allocations, earnings, etc. In some embodiments, the analogy finance system 40 accesses these account to initiate financial transactions that correspond to changes derived from the analogy. For example, if the user moves from an offensive position to a defensive position, one possible action the analogy finance system 40 takes is to sell a portion of the user's assets that are in volatile stocks and purchase assets in stable bonds, etc. In such, the analogy finance system 40 accesses a first financial server 50 to sell a first asset and, if needed, transfer the asset to a second financial server 50, then the analogy finance system 40 accesses the second financial server 50 and purchases the second asset. In some embodiments, the analogy finance system 40 has access to certain financial indexes and status such as certificate of deposit rates, bond offerings, mutual fund performance, stock quotations, stock dividend amounts and distribution dates, etc. This financial data is available through one or more of the financial servers 50.

Figure 3:
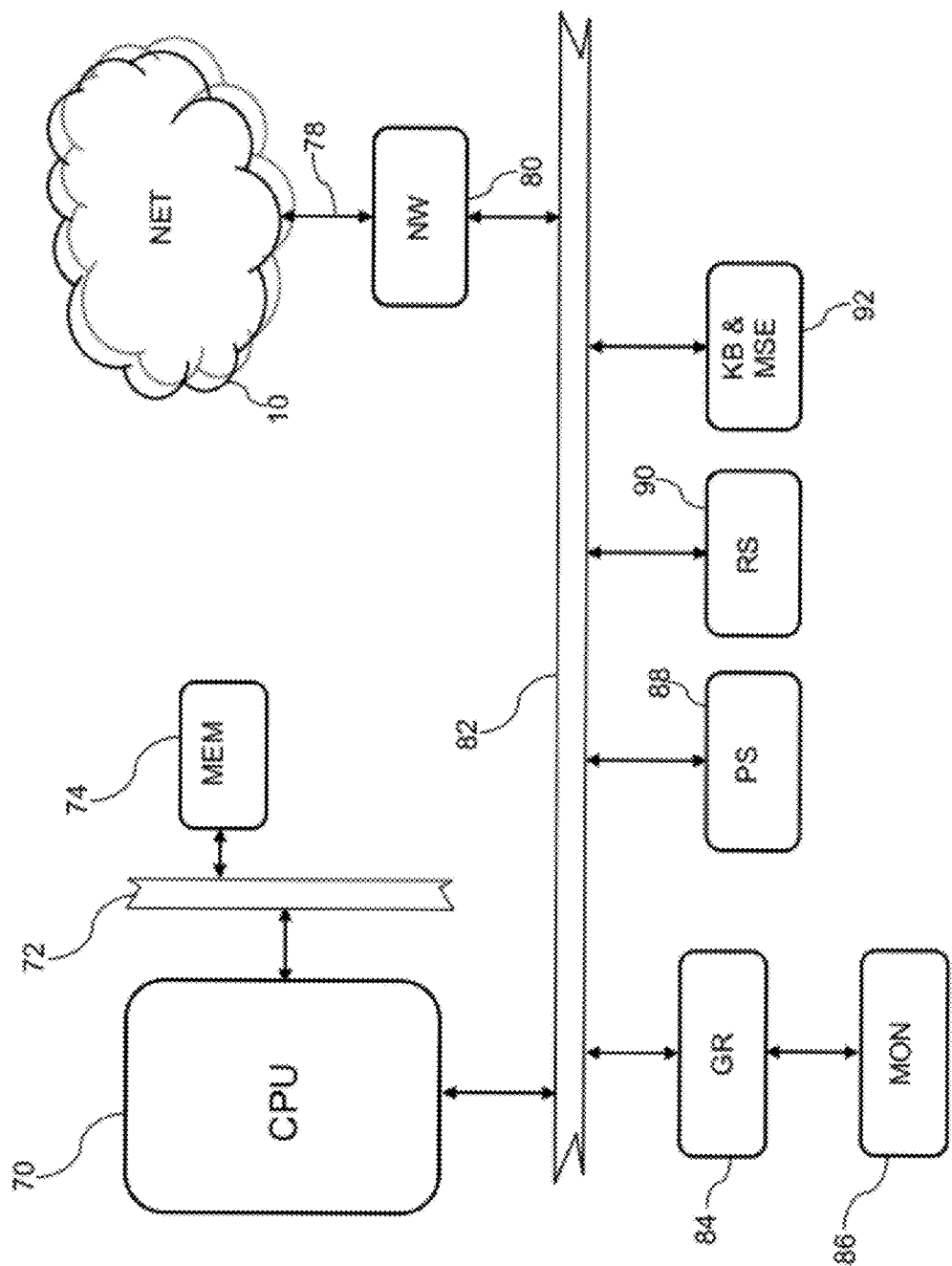
FIG. 3 illustrates a typical computer system.

Referring to FIG. 3, a schematic view of a typical computer system is shown. The example computer system represents a typical computer system used as the server 40 and/or the user client devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 3, a multiple processor system where multiple processors share resources such as memory and storage, a multiple server system where several independent servers operate in parallel (perhaps having shared access to the data or any combination). In any of these systems, a processor 70 executes or runs stored programs that are generally stored for execution within a memory 74. The processor 70 is any processor or a group of processors, for example an Intel Pentium-4® CPU or the like. The memory 74 is connected to the processor by a memory bus 72 and is any memory 74 suitable for connection with the selected processor 210, such as SRAM, DRAM, SDRAM, RDRAM, DDR, DDR-2, etc. Also connected to the processor 70 is a system bus 82 for connecting to peripheral subsystems such as a network interface 80, persistent storage (e.g. a hard disk) 88, removable storage (e.g. DVD, CD, flash drive) 90, a graphics adapter 84 and a keyboard/mouse 92. The graphics adapter 84 receives commands and display information from the system bus 82 and generates a display image that is displayed on the display 86.

In general, the persistent storage 88 is used to store programs, executable code and data such as user financial data in a persistent manner. The removable storage 90 is used to load/store programs, executable code, images and data onto the persistent storage 88. These peripherals are examples of input/output devices 80/84/92, persistent storage 88 and removable storage 90. Other examples of persistent storage include core memory, FRAM, flash memory, etc. Other examples of removable media storage include CDRW, DVD, DVD writeable, Blu-ray, compact flash, other removable flash media, floppy disk, ZIP®, etc. In some embodiments, other devices are connected to the system through the system bus 82 or with other input-output connections/arrangements as known in the industry. Examples of these devices include printers; graphics tablets; joysticks; and communications adapters such as modems and Ethernet adapters.

The network interface 80 connects the computer-based system to the network 10 through a link 78 which is, preferably, a high speed link such as a cable broadband connection, a Digital Subscriber Loop (DSL) broadband connection, a T1 line, or a T3 line.

Referring to FIG. 4, a typical user data entry form 100 of a computer-based financial system is shown. Obtaining data from a user is well known in the industry and the exemplary data entry from 100 is one example of such. Other examples include other types of interfaces (e.g. smart cell phone interfaces), extracting data from other sources such as cookies, databases, files stored at the user's computer 20 or at another data source such as at a financial server 50, etc. One exemplary method of obtaining data from a user us to present a data entry form 100 at a terminal device 20 associated with the user, perhaps by displaying the data entry form 100 by a browser program running on the user terminal device 20, and, after the requested user data 102/104/106/108 is entered, a submit function 109 is selected and the user data 102/104/106/108 is transmitted from the user's terminal/computer 20 to the analogy server 40. It is preferred that the data is sent in a secure manner as known in the industry.

In this example, a first category of data 102 includes personal data about the user such as the user's age (or date of birth), when the user entered the work force and when the user anticipates or wishes to retire. A second category of data 104 includes income such as salary, investment income and other income such as royalties, trust funds, etc. A third set of data 106 includes expenses such as housing, utilities, debt service (e.g. interest), obligations, discretionary spending and other expenses (e.g. child support, alimony, etc.). A fourth set of data 108 includes assets such as liquid assets (e.g. bank accounts, stock, etc.) and approximate investment income as a percentage (e.g., typically earn 1.32% of yearly interest on the liquid assets). It is fully anticipated that additional data or less data be collected in one or more user interface pages 100. It is also anticipated that an initial set of data be collected in a user interface 100 such as that in FIG. 4 and updates and/or additional data be collected in the same interface 100 or in different interfaces. For example, if "age" is collected in the user interface 100, after the user has a birthday, the user needs to adjust this field. The art of collecting and updating such data is well known and it is anticipated that the computer-based financial system uses any known form of data entry and update.

Figure 5:
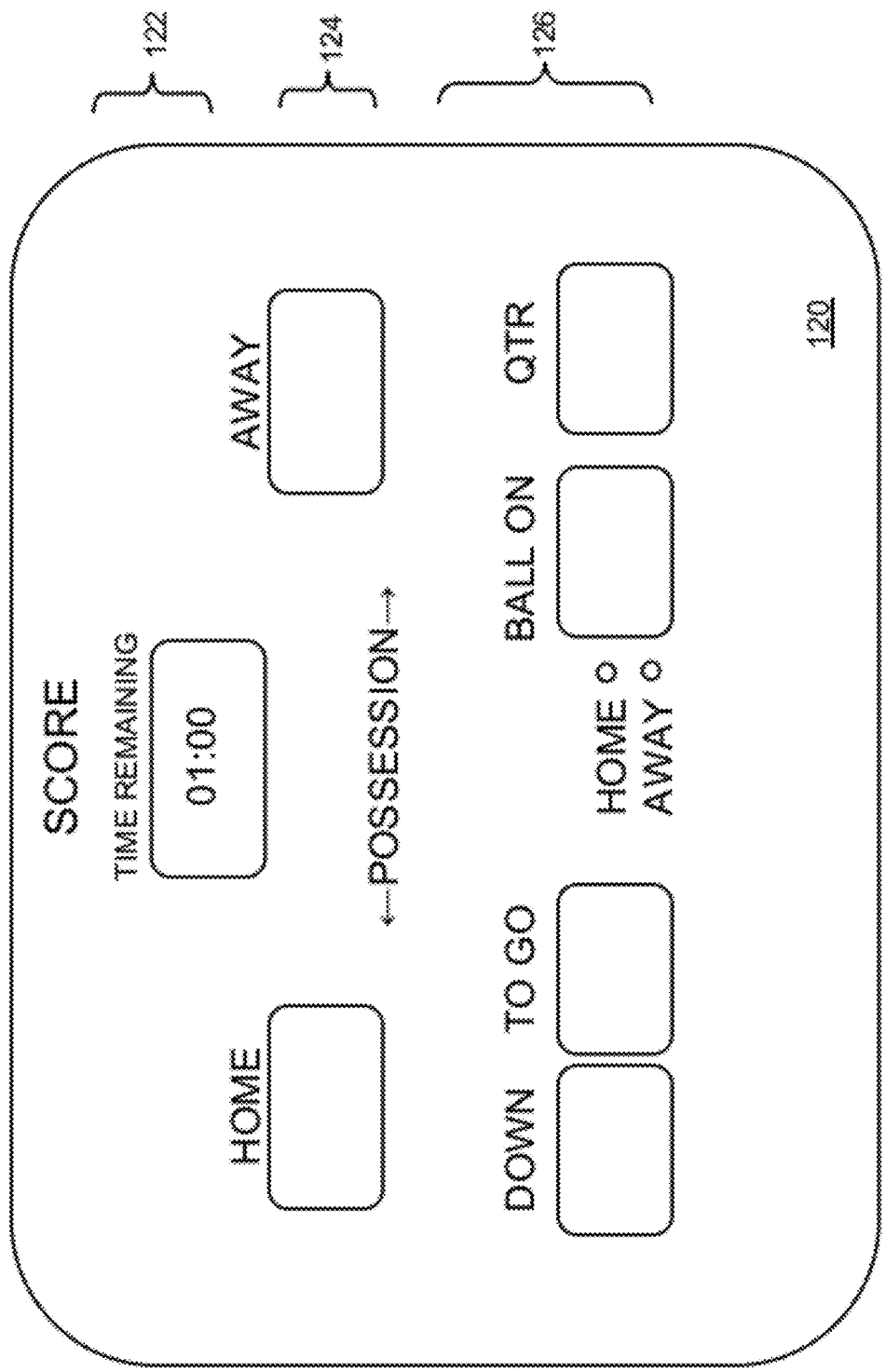
FIG. 5 illustrates a typical scoreboard.

FIG. 5, a typical scoreboard 120 of a computer-based financial system is shown. The exemplary score board 120 is for the football analogy. As discussed prior, other score boards are anticipated for other analogies. The score board 120 is an example and, in other embodiments, it is anticipated that other score boards are used with different layouts and/or different information presented.

Once the user data 102/104/106/108 is captured, the computer-based financial system uses various functions to determine how well the user is doing with respect to their goals. Details of these functions will be described later. An example of such a goal is "to retire at age 60." Many other goals are equally anticipated, including, but not limited to, achieving a specific asset level by a certain age, achieving a specific unearned income level by a certain age, etc.

In financial terms, it is difficult to convey the user's status with respect to their goal(s). A financial neophyte often finds terms such as future value of assets, marginal tax rate and cash flow negative unfathomable. Pity the poor financial advisor who has to explain why their client needs to work until they are 83 based upon their existing income levels and expenses.

To put the user's status into a form that is understandable without using financial terms, the analogy is made and the user's status is mapped into terms of the analogous system. In the examples shown, the analogous system is the game of football. In such, when the user is in certain situations, they are on the offense and in other situations, they are on the defense. The time remaining 122, home/away score 124 and down/yards-to-go/ball-on and quarter 126 are shown on the score board 120 and these game statuses relate to financial data indicating how the user is doing with respect to their financial goal and what actions, if any, are needed. For example, when the user is losing (their score is lower than the opponent), such a losing score alerts the user that either income has to increase (e.g. a second job, overtime) or expenses have to be trimmed (e.g. less movie rentals, cut down on eating out, etc).

Again, for other analogies, different score boards 120 are anticipated. For example, if the analogy is baseball, the home/away team score, inning, number of outs, strikes/balls, etc. are displayed on the score board 120. If the analogy is soccer, the home/away team score, ball position, yellow card/red card status is displayed. Different score boards 120 are presented depending upon the analogy.

The system and method described has two essential portions; (1) personal finance, and (2) portfolio management. Portfolio management will be described in detail with the later discussion regarding FIGS. 6-9. In one embodiment, the two portions are interrelated in that the portfolio management portion utilizes information derived from the personal finance portion. However, in other embodiments, the two portions are completed independently of each other in that the user provides the necessary information to complete the portfolio management portion by inputting a discrete and limited amount of data that would be insufficient to complete the personal finance portion, but sufficient to start and complete the portfolio management portion or vice versa.

In the personal finance portion of the method, the analogy consists of a set of equations. In general, in the preferred embodiments, the time of the analogy (e.g. football game) starts when the user enters the workforce and ends when the user retires, though in alternate embodiments, the analogy maps one event (e.g. a football game) to a fiscal year, etc. For example, in a football analogy, four quarters relates to the user's work life. If the user's adjusted annual free cash flow (AAFCF) is positive, then the user is on the offense (e.g., has possession of the football) and if negative, the user is on the defense. In this analogy, the user's score (e.g., home score) is the estimated years that the user will be able to enjoy retirement based on the assets they are likely to accumulate under the current plan (financials and formations). The opponent's score is the estimated number of years that the user needs to plan for after retirement. In one embodiment, the opponent's score is calculated using the IRS published tables on life expectancy. In situations in which the user is on defense and has a special liability, the away score is adjusted to reflect the accumulated liability. This accounts for a user that is digging a deeper hole and needs to save even more for retirement.

On offense, the down is a reflection of the stability and expected duration of the user's adjusted annual free cash flow (AAFCF). If the stability or duration is in jeopardy, the down number will increase. On defense, the down is a reflection of the anticipated duration of underemployment. For example, over 18 months of over employment corresponds to a $1^{st}$ down, 12 to 18 months corresponds to a $2^{nd}$ down, 6 to 12 months is a third down and less than 6 months is a 4$^{th}$ down. It is preferential to have a higher down on defense since it is more likely that you will be gaining possession of the ball sooner.

Regardless of possession, if it is a first down, the yards-to-go is 10. On offense, the yards-to-go reflects the user's stability and estimated duration of that stability. On defense, the yards-to-go reflects the user's liquid assets with respect to their special liabilities. The higher the ratio between the user's liquid assets compared to the user's special liabilities, the higher will be the yards-to-go.

The location of the ball is determined by the user's non-liquid survival time (NLST). For every year that the user has in NLST, they will be 10 yards from their own goal line. The maximum is the away team's 1 yard line or 99 yards to go.

The financial data entered by the user as shown in FIG. 4 includes, for example, the data items listed in FIG. 11. The left column of this table identifies the financial (e.g. net earned income) and demographic data (e.g. current age) that is captured from the user during initiation or after any change has occurred such as loss of a job, change in expenses, etc. The acronyms in parenthesis are used in the various calculations that drive the analogy. The right column is an explanation of the data.

Various calculations are performed on the data to drive the analogy. A sample set of calculations are shown in FIGS. 12, 13, and 14. For example, years-to-retirement (YTR in FIG. 12) is calculated by subtracting the current age (CA from FIG. 11) from the age of desired retirement (ADR from FIG. 11). For example, if the user is 40 (CA=40) and desires to retire at 65 (ADR=65), then the years to retire (YTR) is set to 25 (65-40). Although shown as typical spreadsheet calculations, the sample calculations shown in FIGS. 11, 12 and 13 are representative equations and any formulation or math package is anticipated. It is fully anticipated that, in other embodiments, similar or different equations are employed to provide similar or different scoring, etc. For example, a different set of equations are employed when a financial advisor wishes to convey stronger or weaker degrees of urgency for their client. In such, the scoring is exaggerated to the better or worse to convey a weaker or stronger need to take action.

The sample calculations shown in FIG. 14 are used to calculate the score board values for display on the score board 120.

Referring to FIG. 15, an exemplary set of data related to a fictitious person, John Q. Public is shown. This data is provided by the user and/or extracted from on-line accounts indicated by the user. In this example, the user earns $55,000 and spends around $35,600 each year. The user has $690,500 in assets and $150,000 in liabilities. This user's risk profile is moderately aggressive.

Referring to FIG. 16, calculated values based upon the exemplary set of data from FIG. 15 are shown. The values have been calculated using the equations from FIGS. 12 and 13.

Referring to FIG. 17, calculated score values based upon the exemplary set of data from FIG. 15 and the calculations from FIG. 16 are shown. For example, the user's score (Home Score) is 14, meaning that under the user's current financial plan, the user is expected to accumulate assets sufficient to maintain their current lifestyle for 14 years post retirement. The opponent's score is 22, meaning the number of years that the user needs to plan for after retirement is around 22 years. As such, the user is losing and the user needs to re-formulate their plan to account for the deficit since it is expected that they will live eight years more than their anticipated accumulated assets will likely support their current lifestyle.

Figure 18:
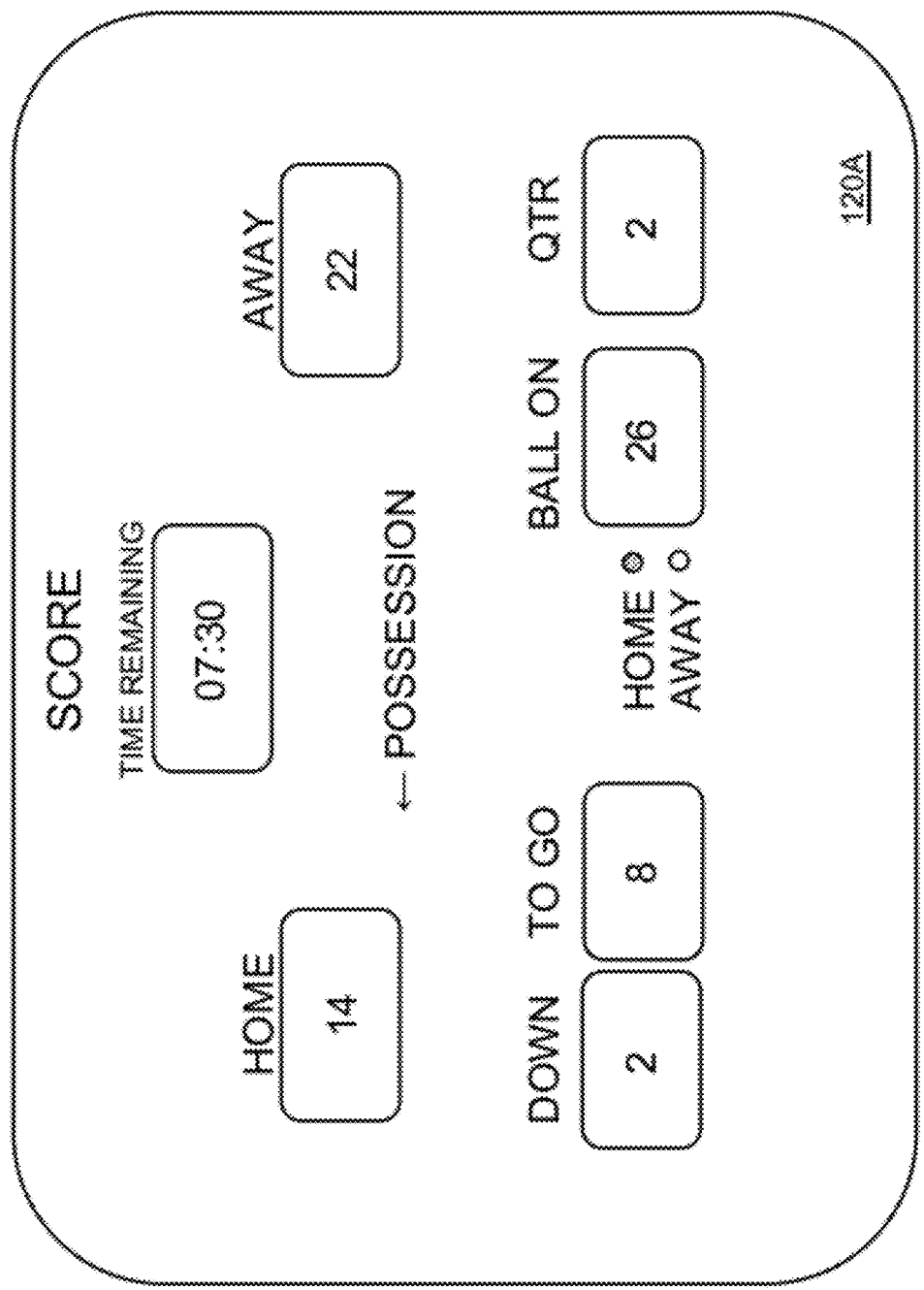
FIG. 18 illustrates displayed score values based upon the exemplary set of data.

Referring to FIG. 18, displayed score values 120A based upon the exemplary set of data is shown. The data display 120A of FIG. 18 pictorially shows the values from the table in FIG. 17 in a way that the user is accustom to seeing scores of, for example, a football game. This is an exemplary display format and any display format is anticipated.

Referring to FIGS. 19-22, sample calculations used to calculate the score board values for four other analogies are shown. Since other analogies have different numbers of players, numbers of periods, scoring, duration; each analogy has a different scoreboard and equations used to derive the current score. For example, referring to FIG. 19, baseball has innings instead of periods, outs instead of downs and team at-bat instead of possession. The sample equations shown in FIGS. 19-22 are exemplary equations used to generate score values for their respective sports analogies; baseball (FIG. 19), soccer (FIG. 20), hockey (FIG. 21) and basketball (FIG. 22). As previously discussed, the present invention anticipates many analogies including the above disclosed sports analogies, other sports analogies (e.g. rugby, tennis), game analogies (e.g. monopoly, bridge, chess), and other analogies not related to sports or games.

In the portfolio management portion of the method, the analogy consists of a set of possible formations and a set of rules. The user sets up formations according to the rules and the user's allocation quota which is the number of allocation points the user has been awarded based upon their financial status. For example, if the user has sufficient assets to survive for over two years, the user is awarded more allocation points than if not. As another example, if the user is gaining assets, they are awarded more allocation points than if the user is depleting assets.

Figure 6:
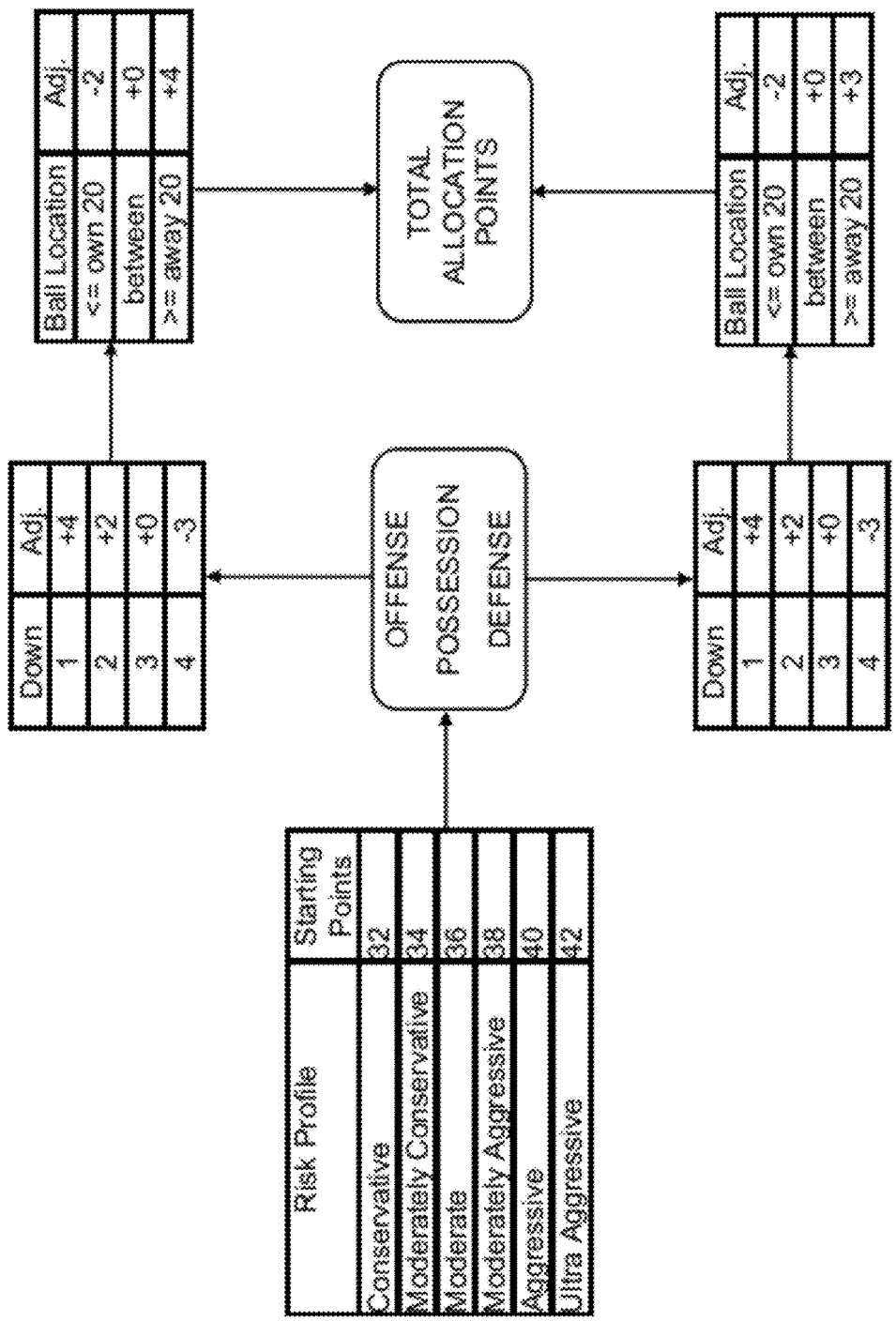
FIG. 6 illustrates a typical point allocation chart.

FIG. 6 shows an example of how a user's total allocation points are derived with respect to portfolio management or asset management. As an example, one such equation adjusts the user's allocation points based upon the user's risk profile. In this example, if the user's risk profile is moderate, the user starts with a base of 36 allocation points and if it is 1$^{st}$ down, 4 points are added making the user's total allocation points 40, but if it is 4$^{th}$ down, 3 points are deducted making the total 33. The number of allocation points is further adjusted based upon other factors such as ball location as shown in FIG. 6. As stated prior, other analogies, such as a different sport are fully anticipated. In such, using another sport as the analogous concept, the ball location is substituted with another metaphor such as outs or players on base, etc.

Figure 9:
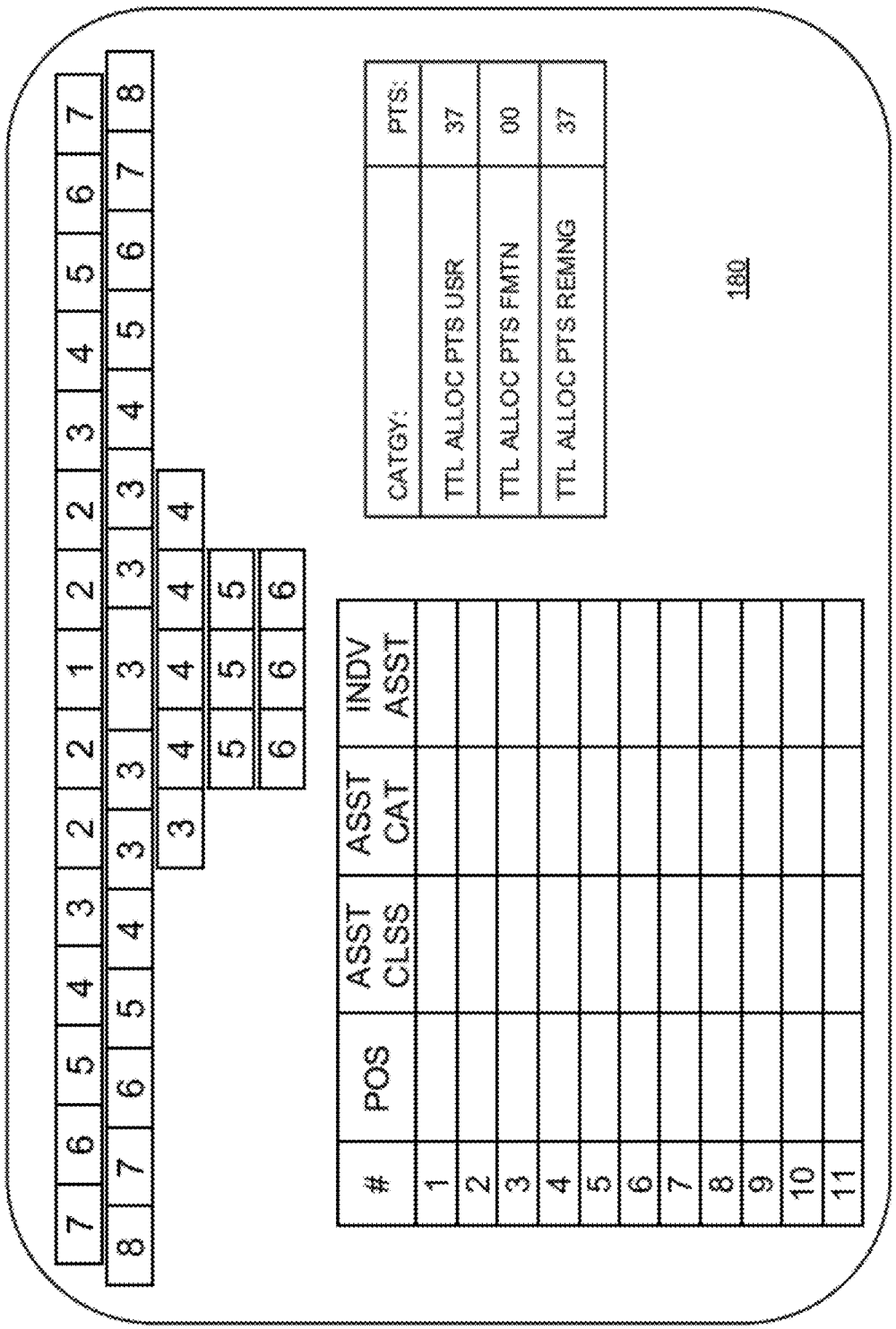
FIG. 9 illustrates a typical flow chart of a computer-based financial system.

Now, the user places the variable components of the known system (players) onto formation maps as shown in FIGS. 7-9. In such, the rules limit certain formations. For example, depending upon the user's total allocation points, the user is limited to allocations among different positions in the analogy such as quarter back, wide receivers, half backs, etc. Each position requires allocation of a number of allocation points. Each position relates to a range of asset classes, the more conservative positions relating to the more conservative asset classes (e.g. Treasury Bills) while the more aggressive positions relate to more aggressive asset classes (e.g. micro-cap stocks). The corresponding asset class of the location of a player on the formation map equals the number of asset allocation points required to place the player in that position. As such, placing a quarter back in a five box will result in the expenditure of five allocation points, and so on and so forth.

As described with FIGS. 7-9, the user is provided a fixed number of allocation points that are used to allocate players to positions on the field. In general, positions away from the middle of the line of scrimmage are higher risk positions and require more allocation points. An initial determination of allocation points is made based upon the user's risk profile. For example, if the user's risk profile is moderate, 36 allocation points are initially provided. This initial allocation is modified based upon whether the user is on offense or defense, the current down and the ball location on the field. For example, if the user in the above example is on offense and it is the first down (+4 allocation points) and they are past the away 20 yard line (also +4 allocation points), their total allocation points are 44. As will be shown, the access points are used to allocate players to various positions. In some embodiments, users are free to utilize less allocation points then they have been allocated; however, in the preferred embodiment, the user is not allowed to utilize more points then they have been allocated.

Referring to FIG. 7, a typical defensive formation chart 140 is shown. This is one example of a typical user interface that is presented to the user to allocate assets. In this example, the user has 37 points to allocate among players/positions and has not allocated any (00) and, therefore, has 37 allocation points remaining. This is an example of a defensive position chart. Note that there are 11 positions relating to the 11 players allowed on the field for the user's team. In this example, the rules of the analogy stipulate that there must be an allocation made to each player and, therefore, the user must allocate approximately $\frac{1}{11}^{th}$ of his or her assets to each player.

It is fully anticipated that in certain circumstances, the number of players is modified either because the analogous system (e.g. game) has more or fewer players than football. Also, it is anticipated that, in some embodiments, the number of players is set at the discretion of a system operator. For example, the system operator sets up the system to have users select 15 players instead of the described 11 players, the excess 4 players being considered reserve players and providing greater diversification. In another example, selection of only 7 players is provided and the excluded 4 players are considered unnecessary and the portfolio's diversification being reduced.

Referring to FIG. 8, a typical completed formation chart 160 is shown. This is one example of a typical user interface that is presented to the user to allocate assets. In this example, the user has 37 points to allocate among players/positions and has allocated 35 and, therefore, has 2 allocation points remaining. This is one example of an allocation to a defensive position chart. Note that there are 11 positions relating to the 11 players allowed on the field for the user's team. In this example, there must be an allocation made to each player and, therefore, the user must allocate $\frac{1}{11}^{th}$ of his or her assets to each player. Exemplary allocation rules for defense are shown in Table 1.

TABLE 1

| POS | ASSET CLASS | MAX NMBR | MIN NMBR | MAX PTS |
|---|---|---|---|---|
| FS | 4-7 | 1 | 0 | 7 |
| SS | 3-6 | 2 | 0 | 13 |
| CB | 4-5 | 4 | 0 | 20 |
| LB | 3-5 | 4 | 0 | 20 |
| DE | 2 | 2 | 2 | 4 |
| DT | 1 | 2 | 1 | 2 |
| NG | 1 | 1 | 0 | 1 |

For example, when the user is on defense, the user must allocate exactly two defensive ends (DE) and at least one but not more than two defensive tackles (DT). The defensive ends (DE) must go into positions on the formation chart that are for asset class 2 and the defensive tackles (DT) must go into positions that are for asset class 1. As shown in FIG. 7, two defensive ends (DE) and two defensive tackles (DT) are allocated. For positions that have a range of asset categories, such as line backers (LB), the user has the freedom to assign those players to several positions in the formation 160. As shown in FIG. 7, the two line backers (LB) are assigned to positions that are for the asset category 3.

Referring to FIG. 9, a typical offensive formation chart 180 is shown. This is one example of a typical user interface that is presented to the user to allocate assets. In this example, the user has 37 points to allocate among offensive players/positions and has not allocated any (00) and, therefore, has 37 allocation points remaining. This is an example of a offensive position chart. Note that there are 11 positions relating to the 11 players allowed on the field for the user's team. In this example, there must be an allocation made to each player and, therefore, the user must allocate $\frac{1}{11}^{th}$ of his or her assets to each player. In this example, there must be an allocation made to each player and, therefore, the user must allocate $\frac{1}{11}^{th}$ of his or her assets to each player. Exemplary allocation rules for offense are shown in Table 2.

TABLE 2

| POS | ASSET CLASS | MAX NMBR | MIN NMBR | MAX PTS |
|---|---|---|---|---|
| QB | 3-5 | 1 | 1 | 5 |
| WR | 6-8 | 4 | 0 | 28 (2 8'S MAX) |
| HB | 3-6 | 3 | 0 | 18 |
| FB | 3-5 | 2 | 0 | 10 |
| TE | 3-4 | 2 | 0 | 8 |
| T | 2-3 | 2 | 2 | 6 |
| G | 2 | 2 | 2 | 4 |
| C | 1 | 1 | 1 | 1 |

Once the user has placed the variable components of the known system (the players) onto the respective formation map, for example through an interactive graphic interface or by an interactive table, each player then has an assigned asset class. The user then selects an asset category for each player from the specific asset class. Lastly, the user selects a specific asset from the corresponding asset category. An example of this process is to place a QB on a position on the formation map that corresponds to an asset class of 3. From there, the user selects an asset category from a discrete list of categories that are contained in asset class 3, such as AAA Corporate Bond Funds. The user then selects a specific asset that corresponds to the asset category, such as Mutual Fund XYZ AAA Corporate Bond Fund.

Figure 10:
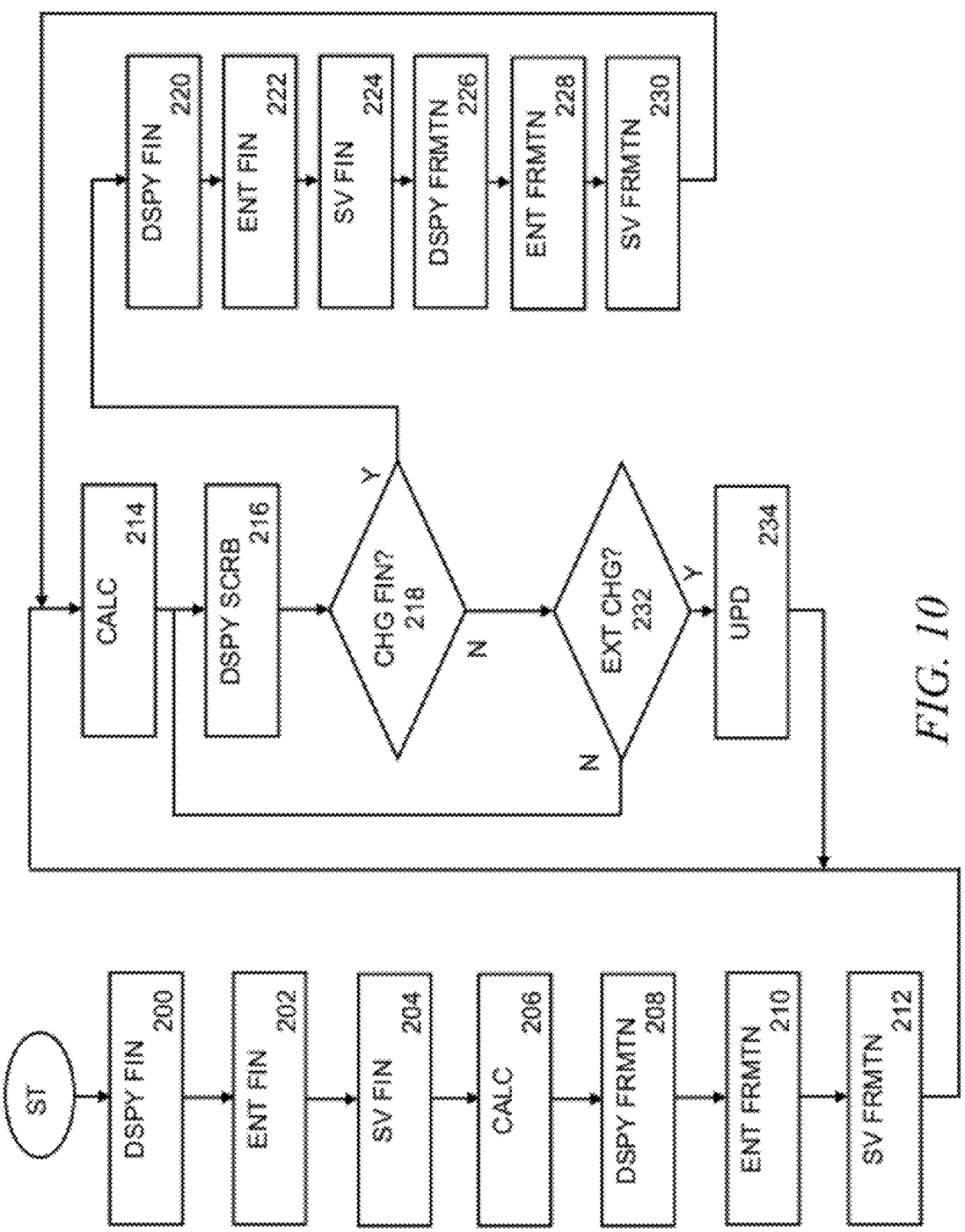
FIG. 10 illustrates data items collected from a user of a computer-based financial system.

Referring to FIG. 10, a typical flow chart of a computer-based financial system is shown. The two portions of the system and method are shown together in this flow. The process starts with the personal finance portion. To start, one or more data entry screens are displayed 200 and the user enters any incomplete or missing financial data 202 and the financial data is saved 204. The financial data includes, for example, incomes, expenses and assets.

Now a calculation is made 206 based upon the financial data. In some embodiments, the calculation 206 includes accessing one or more financial servers 50 to ascertain the current valuation of one or more assets described in the financial data. The calculations determine a number of allocation points for use in the asset allocation steps (208-212). A blank formation chart is displayed 208. The formation chart is, for example, a defensive formation chart 140 or an offensive formation chart 180. In some situations, some of the formation data is pre-filled based upon the assets entered 202 in the financial data.

The user enters their formation data 210 and the formation is saved 212. Now their score and other parameters are calculated 214 and the scoreboard 120 is displayed 216. The calculation yields a current view of the user's financial status in the form of a scoreboard. Their score and other parameters are calculated 214 and the scoreboard 120 is displayed 216.

Now the program loops (or is terminated, then restarted later).

If something happens to change the user's financials such as a change in investments, change in employment status, etc., the system detects a change 218 either automatically or by the user entering a directive to update their financial data. Since the financials have been changed, the formation is again displayed 226 and the user changes 228 the formation data as desired and the formation data is again saved 230. It is anticipated that, in some examples, the formation data doesn't change. For example, if the user receives a 2% raise, there is no need to change the formation data. After the data is entered and saved, the program loops to re-calculate the score 214.

If there is no change to the financial data indicated 218, the computer-based financial system determines if an external change occurred 232. It is anticipated that this check on financial data changes 232 is performed at specific times and dates. For example, the user's financial data is updated after 4:00 PM Eastern Time to indicate the closing prices of any stocks in the user's assets. If no change has occurred, the program loops back to displaying 216 the scoreboard 120. If changes have occurred 232, the financial data is updated 234 to reflect the changes. For example, if the user has 100 shares of MSFT in the financial data as an asset valued at 25.32 per share and, at 4:00 PM Eastern time, the closing price of the shares is $26.44, the value of that asset is updated 234 and the user's status recalculated 214 and the scoreboard 120 is updated 216.

In general, in the preferred embodiments, the time of the analogy (e.g. football game) starts when the user enters the workforce and ends when the user retires. In the football analogy, this would be four quarters. If the user's adjusted annual free cash flow (AAFCF) is positive, then the user is on the offense (e.g., has possession of the football) and if negative, the user is on the defense. In this analogy, the user's score (e.g., home score) is the estimated years that the user will likely accumulate for retirement under the current plan (financials and formations). The opponent's score is the estimated number of years that the user needs to plan for after retirement. The opponent's score is calculated using the IRS published tables on life expectancy. In situations in which the user is on defense and has a special liability, the away score is adjusted to reflect the accumulated liability. This accounts for a user that is digging a deeper hole and needs to save even more for retirement.

On offense, the down is a reflection of the stability and expected duration of the user's adjusted annual free cash flow (AAFCF). If the stability or duration is in jeopardy, the down number will increase. On defense, the down is a reflection of the anticipated duration of underemployment. For example, over 18 months of over employment corresponds to a $1^{st}$ down, 12 to 18 months corresponds to a $2^{nd}$ down, 6 to 12 months is a third down and less than 6 months is a $4^{th}$ down.

Regardless of possession, if it is a first down, the yards-to-go is 10. On offense, the yards-to-go reflects the user's stability and estimated duration of that stability. On defense, the yards-to-go reflects the user's liquid assets with respect to their special liabilities. The higher the ratio between the user's liquid assets compared to the user's special liabilities, the higher will be the yards-to-go.

The location of the ball is determined by the user's NLST. For every year that the user has in NLST, they will be 10 yards from their own goal line. The maximum is the away team's 1 yard line or 99 yards to go.

The financial data entered by the user as summarized in FIG. 4 includes, for example, the data items detailed in FIG. 10. The left column of this table includes the financial (e.g. earned income) and demographic data (e.g. current age) that is captured from the user during initiation or after any change has occurred such as loss of a job, change in expenses, etc. The acronyms in parenthesis are used in the various calculations that drive the analogy.

Various calculations are performed on the data to drive the analogy. A sample set of calculations are shown in FIGS. 11, 12, and 13. For example, years-to-retirement (YTR) is calculated by subtracting the current age (CA) from the age of desired retirement (ADR). For example, if the user is 40 (CA=40) and desires to retire at 65 (ADR=65), then the years to retire (YTR) is set to 15 (65-40). Although shown as typical spreadsheet calculations, the sample calculations shown in FIGS. 11, 12 and 13 are representative and any formulation or math package is anticipated.

The sample calculations shown in FIG. 14 are used to calculate the score board values for display on the score board 120.

Referring to FIG. 15, an exemplary set of data related to a fictitious person, John Q. Public is shown. This data is provided by the user and/or extracted from on-line accounts indicated by the user. In this example, the user earns $55,000 and spends around $35,600 each year. The user has $690,500 in assets and $150,000 in liabilities. This user's risk profile is moderately aggressive.

Referring to FIG. 16, calculated values based upon the exemplary set of data from FIG. 15 are shown. The values have been calculated using the equations from FIGS. 12 and 13.

Referring to FIG. 17, calculated score values based upon the exemplary set of data from FIG. 15 and the calculations from FIG. 16 are shown. For example, the user's score (Home Score) is 14, meaning that it is estimated that the user will need to continue at their current pace for 14 years before retirement. The opponent's score is 22, meaning the number of years that the user needs to plan for after retirement is around 22 years.

Referring to FIG. 18, displayed score values 120A based upon the exemplary set of data is shown. The data display 120A of FIG. 18 pictorially shows the values from the table in FIG. 17 in a way that the user is accustom to seeing scores of, for example, a football game. This is an exemplary display format and any display format is anticipated.

Referring to FIGS. 19-22, sample calculations used to calculate the score board values for four other analogies are shown. Since other analogies have different numbers of players, numbers of periods, scoring, duration, each analogy has a different scoreboard and equations used to derive the current score. For example, referring to FIG. 19, baseball has innings instead of periods, outs instead of downs and team at-bat instead of possession. The sample equations shown in FIGS. 19-22 are exemplary equations used to generate score values for their respective sports analogies; baseball (FIG. 19), soccer (FIG. 20), hockey (FIG. 21) and basketball (FIG. 22). As previously discussed, the present invention anticipates many analogies including the above disclosed sports analogies, other sports analogies (e.g. rugby, tennis), game analogies (e.g. monopoly, bridge, chess), and other analogies not related to sports or games.

It is anticipated that the systems described be used in various ways. For example, a financial analyst uses the system to track the financials of his or her customers and presents the scoreboard to the customer to explain the customer's status. In another example, the system is used in a competition between various users. In some embodiments, on or more pre-determined allocation maps are available and the user's assets are mapped into a selected pre-determined allocation map. For example, if the analogy is football, the one or more allocation maps is one or more football formations and rules regarding placement of assets corresponding to players and a location of the player on the formation.

Referring to FIG. 23, a sample asset allocation for the football analogy is shown. FIG. 23 shows an example of how a user's assets are allocated. In this example, though not required, the user's assets are equally divided across the eleven players on the football field. In this, 9.09% of the user's assets are allocated to each of 11 asset classes and corresponding player positions. This exemplary user is on offense and, hence has a quarterback, a center, a half back, wide receivers, etc. Note that this exemplary allocation of assets has four wide receivers and, is therefore, a high-risk and high-growth oriented allocation. For each position, an asset class, asset category and specific asset is indicated. For example, the quarterback is in the asset class 3. From Table 2 (above) we find that there has to be exactly one quarterback and we can assign the quarterback an asset class of from 3 to 5. In this example, the user or financial planner has assigned the quarterback an asset class 3 which is defined as "Domestic Large Cap Value" and the actual asset that is associated with that asset class is "Federated Large Cap Equities Fund." In this example, if the user has $11,000 in assets, then each position is assigned 9.09% of that asset, of approximately $1000. Therefore, this user has $1,000 of his or her assets invested in the "Federated Large Cap Equities Fund," etc.

As shown in Table 2, a maximum of 4 and a minimum of zero wide receivers are possible in an offensive formation. In the example of FIG. 23, the user has allocated the maximum (4) wide receivers. Also, according to Table 2, the maximum allocation of asset class is indicated as 28. In the example of FIG. 23, the user has allocated 26 asset points to the wide receivers, two of the wide receivers being of asset class 6 and the other two of the wide receivers being of asset class 7. As shown, these assets are four different individual assets.

Figure 24:
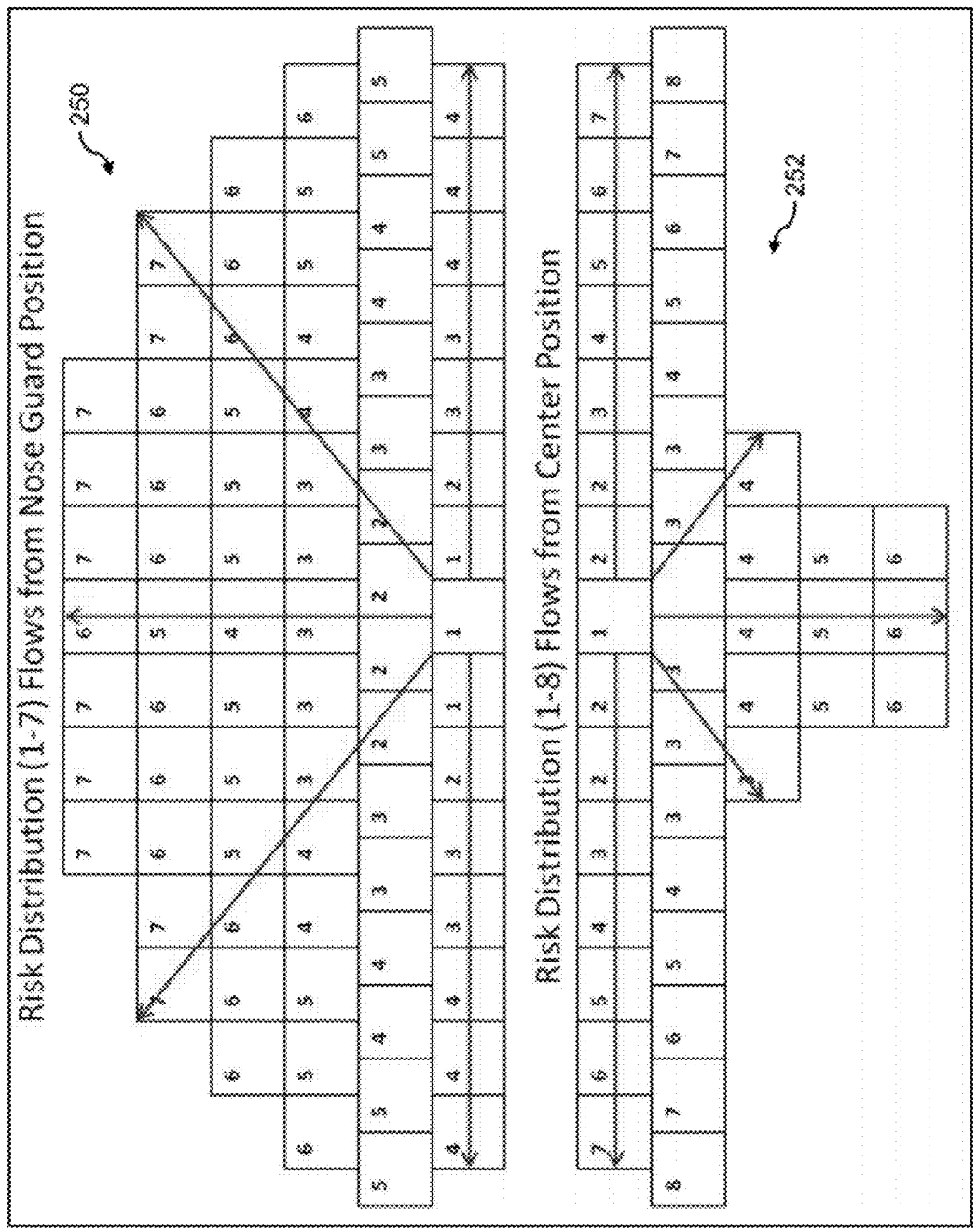
FIG. 24 illustrates defensive and offensive risk distributions for the football analogy.

Referring to FIG. 24, defensive and offensive risk distributions for various formations in the football analogy is shown. The relative risk charts shows locations for the various players within two different formations 250/252, the lowest risk being on the line of scrimmage at the center as indicated by the arrows emanating from the center position, outward. For example, a very tight formation with all player allocations closer to the line and centered has a lower risk level than a loose formation with player allocations at the end positions and back positions, farthest away from the center. Again, the formations shown in FIG. 24 are exemplary and many different formations are anticipated.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for presenting financial data, the system comprising:
    a computer;
    storage operatively interfaced to the computer;
    a user profile stored on the storage, the user profile containing user information and user financial data; and
    software running on the computer, the software reads the user profile and translates the user information and the user financial data into a financial status, the user profile comprises user information and financial data, the user information comprises an age of the user or a date of birth of the user, an age of retirement goal, and the financial data comprises one or more data selected from the group consisting of assets, incomes, debts and expenses;
    the software calculates a time remaining that is proportionate to the number of years until the age of retirement goal is achieved, an estimate of the time that the user will be soluble after retirement based on the assets that the user is predicated to accumulate and the software calculates an estimate of time that the user needs to plan for after retirement based on an estimated life expectancy of the user;
    the software translates the estimate of time that the user will be soluble after retirement into a home score and translates the estimate of time that the user needs to plan for after retirement into an away score;
    the software displays the home score and away score in a scoreboard format of a predetermined sports analogy.

2. The system for presenting financial data of claim 1, wherein the predetermined sports analogy is an analogy to a football game, the presentation format is in the format of a scoreboard for the football game, and the score includes the home score and the away score.

3. The system for presenting financial data of claim 2, wherein the scoreboard further includes, quarter, down, and possession of the football.

4. The system for presenting financial data of claim 2, wherein the user financial data comprises a set of assets and the user allocates the assets to one or more player positions of the predetermined sport analogy in a formation map of the predetermined sport analogy.

5. The system for presenting financial data of claim 3, wherein the user financial data comprises a set of assets and the user allocates the assets to one or more football player positions on a formation map of the football game.

6. The system for presenting financial data of claim 1, wherein the sport analogy is a baseball game analogy and the scoreboard representing the financial status in terms of the baseball game analogy further comprises inning, outs, and team at-bat in the baseball game analogy.

7. The system for presenting financial data of claim 1, wherein the sport analogy is a soccer game analogy and the scoreboard representing the financial status in terms of the soccer game analogy further comprises period, minutes, seconds, and possession of the ball in the soccer game analogy.

8. The system for presenting financial data of claim 1, wherein the sport analogy is a hockey game analogy and the scoreboard representing the financial status in terms of the hockey game analogy further comprises period, and minutes, seconds, and possession of the puck in the hockey game analogy.

9. The system for presenting financial data of claim 1, wherein the sport analogy is a basketball game analogy and the scoreboard representing the financial status in terms of the basketball game analogy further comprises, quarter, minutes, seconds, and possession of the ball in the basketball game analogy.

10. The system for presenting financial data of claim 1, wherein the user financial data comprises a set of assets and the user allocates the assets to one or more elements of the predetermined sport analogy in a formation map of the predetermined analogy.

11. A method of presenting financial data, the method comprising:
    entering data into a user profile, the user profile stored in a storage of a computer, the user profile containing user information and user financial data;
    entering an age or date of birth of the user,
    an age of retirement goal, and one or more data selected from the list consisting of assets, incomes, debts and expenses;
    calculating by the computer a financial status based upon the user information and user financial data;
    calculating a time remaining that is proportionate to the number of years until the age of retirement goal is achieved and an estimate of the time that the user will be soluble after retirement based on the assets that the user is predicated to accumulate;
    calculating an estimate of time that the user needs to plan for after retirement based on an estimated life expectancy of the user;
    translating by the computer of the financial status into a presentation view according to a predetermined sports analogy by translating the estimate of time that the user will be soluble after retirement into a home score of the user and translating the estimate of time that the user needs to plan for after retirement into an away score; and
    displaying by the computer of the presentation view being in terms of a scoreboard of the sports analogy, the scoreboard comprising the home score, the away score, and time remaining of the sports analogy.

12. The method of presenting financial data of claim 11, further comprising the step of entering changes to the data and repeating the steps of calculating, translating, and displaying.

13. The method of presenting financial data of claim 11, wherein the sports analogy is football and the step of displaying comprises displaying of the home score, the away score, time-remaining, quarter, down, and possession of a football game.

14. The method of presenting financial data of claim 13, wherein the user financial data comprises a set of assets and the method further comprises allocating the assets to one or more football player positions on a formation map of the football game.

15. The method of presenting financial data of claim 11, wherein the user financial data comprises a set of assets and the method further comprises allocating the assets to one or more elements of the sports analogy.

16. The method of presenting financial data of claim 11, wherein the sports analogy is a baseball game and the step of displaying includes displaying scores, inning, outs, and team at-bat in the baseball game.

17. The method of presenting financial data of claim 11, wherein the sports analogy is a soccer game and the step of displaying includes displaying scores, period, minutes, seconds, and possession in the soccer game.

18. The method of presenting financial data of claim 11, wherein the sports analogy is a hockey game and the step of displaying includes displaying scores, period, and minutes, seconds and possession in the hockey game.

19. The method of presenting financial data of claim 11, wherein the sports analogy is a basketball game and the step of displaying includes displaying scores, quarter, minutes, seconds, and possession in the basketball game.

20. Program instructions tangibly embodied in a non-transitory tangible storage medium comprising at least one instruction configured to implement a financial status display system, wherein the at least one instruction comprises:
    computer readable instructions for reading a user profile stored in the storage medium, the user profile containing user information and user financial data, the user information comprises an age of the user or a date of birth of the user, an age of retirement goal, and the financial data comprises one or more data selected from the group consisting of assets, incomes, debts and expenses;
    computer readable instructions for calculating a time remaining that is proportionate to the number of years until the age of retirement goal is achieved, an estimate of the time that the user will be soluble after retirement based on the assets that the user is predicated to accumulate and the software calculates an estimate of time that the user needs to plan for after retirement based on an estimated life expectancy of the user;
    computer readable instructions for translating the estimate of time that the user will be soluble after retirement into a home score and translates the estimate of time that the user needs to plan for after retirement into an away score; and
    computer readable instructions for displaying the home score and away score in a scoreboard format of a predetermined sports analogy.

21. The program instructions tangibly embodied in a tangible storage medium of claim 20, further comprising at least one instruction configured for displaying time-remaining, quarter, down, and possession of the football game.

22. The program instructions tangibly embodied in a tangible storage medium of claim 20, wherein the user financial data comprises a set of assets and the at least one instruction comprises computer readable instructions for allocating the assets to one or more football player positions on a formation map of the football game.

* * * * *